United States Patent [19]
Hollier

[11] Patent Number: 5,940,792
[45] Date of Patent: Aug. 17, 1999

[54] NONINTRUSIVE TESTING OF TELECOMMUNICATION SPEECH BY DETERMINING DEVIATIONS FROM INVARIANT CHARACTERISTICS OR RELATIONSHIPS

[75] Inventor: Michael P. Hollier, Ipswich, United Kingdom

[73] Assignee: British Telecommunications Public limited company, London, United Kingdom

[21] Appl. No.: 08/765,697

[22] PCT Filed: Aug. 17, 1995

[86] PCT No.: PCT/GB95/01951

§ 371 Date: Jan. 13, 1997

§ 102(e) Date: Jan. 13, 1997

[87] PCT Pub. No.: WO96/06495

PCT Pub. Date: Feb. 29, 1996

[30] Foreign Application Priority Data

Aug. 18, 1994 [EP] European Pat. Off. .............. 94306081

[51] Int. Cl.⁶ ...................................................... H04M 3/22
[52] U.S. Cl. ........................................ 704/228; 379/88.09
[58] Field of Search .................................... 704/228, 239; 379/88.09

[56] References Cited

U.S. PATENT DOCUMENTS

| | | | |
|---|---|---|---|
| 5,313,555 | 5/1994 | Kamiya | 704/233 |
| 5,590,242 | 12/1996 | Juang et al. | 704/245 |
| 5,664,059 | 9/1997 | Zhao | 704/254 |
| 5,778,336 | 7/1998 | Chou et al. | 704/222 |
| 5,794,192 | 8/1998 | Zhao | 704/244 |
| 5,812,972 | 9/1998 | Juang et al. | 704/234 |

FOREIGN PATENT DOCUMENTS 0 565 224 A2 10/1993 European Pat. Off. ......... H04M 3/30
0 567 439 A1 10/1993 European Pat. Off. ......... H04Q 7/04
62-092646 4/1987 Japan .............................. H04M 3/24

OTHER PUBLICATIONS

Yunxin Zhao, "A New Speaker Adaptation Technique Using Very Short Calibration Speech", Proc. ICASSP 93, vol. II, pp. 562–565, Apr. 1993.

Mazin G. Rahim et al., "Signal Bias Removal for Robust Telephone Based Speech Recognition in Adverse Environments," Proc. ICASSP 94, vol. I, pp. 445–448, Apr. 1994.

Yunxin Zhao, "An Acoustic–Phonetic–Based Speaker Adaptation Technique for Improving Speaker–Independent Continuous Speech Recognition," IEEE Trans. on Speech and Audio Processing, vol. 2, No. 2, pp. 380–394, Jul. 1994.

David B. Ramsden, "In–Service Nonintrusive Measurement on Speech Signals," Proc. GLOBECOM 91, pp. 1761–1764, Dec. 1991.

*Primary Examiner*—David R. Hudspeth
*Assistant Examiner*—Tālivaldis Ivars Šmits
*Attorney, Agent, or Firm*—Nixon & Vanderhye P.C.

[57] ABSTRACT

A method of analysis of characteristics of a telecommunications network measures properties of speech carried by a line under test and includes the steps of identifying a part of the speech signal which has a property independent of the talker, and detecting deviations from that property in the received signal, thereby identifying characteristics of the signal imposed by the system. The properties identified may be characteristic waveforms of speech phonemes, in which the fact that the human voice is only capable of making certain sounds is used to determine what deviations from those sounds have been imposed by the system. In an alternative arrangement identifying a part of the speech signal having a property which varies in a predetermined manner in relation to an absolute characteristic of the talker, and deriving the absolute characteristics therefrom. The absolute characteristic may be the absolute level of the voice, and the other property may be a talker-independent function of the absolute level, such as the spectral content of the unvoiced fricatives in the speech.

24 Claims, 7 Drawing Sheets

| | | |
|---|---|---|
| /h/ | Voiceless fricatives | *h*at |
| /f/ | | *f*ix |
| /θ/ | | *th*ick |
| /s/ | | *s*at |
| /ʃ/ | | *sh*ip |
| | | |
| /v/ | Voiced fricatives | *v*an |
| /ð/ | | *th*is |
| /z/ | | *z*oo |
| /ʒ/ | | a*z*ure |
| | | |
| /dʒ/ | Affricates | *j*oke |
| /tʃ/ | | *ch*ew |

NONINTRUSIVE TESTING OF TELECOMMUNICATION SPEECH BY DETERMINING DEVIATIONS FROM INVARIANT CHARACTERISTICS OR RELATIONSHIPS

BACKGROUND OF THE INVENTION

1. Field of the Invention

This invention relates to the testing of telecommunications systems.

2. Related Art

Modern telecommunications systems perform complex operations on the signals they handle in the process of transmitting the signals through the telecommunications network, for example digitisation and compression techniques. These operations have non-linear effects on the signal inputs and it is thus not possible to model the effects of the network by the simple additive effect of each component of the network. In particular, the effect of the network on speech is not easily derivable from studying its effect on a simple test signal such as a sine wave.

Various methods of deriving test signals which mimic generalised speech properties have been devised (see for example German Patent specification DE 3708002 (Telenorma), European patent specification EP0567439, and the present applicant's published International applications WO94/00922 and WO 95/01011), but these must all presuppose certain conditions, and in particular they require the use of predetermined test signals. The use of live (real time) traffic as a test signal for these tests would be impossible. The test site (which may be many thousands of miles away from the signal source in the case of an intercontinental link) needs to have knowledge of the test signal, so that deviations from the test signal can be distinguished from the test signal itself. The use of prearranged test signals may also require cooperation between the operators of two or more networks. Moreover, any line carrying a voice-frequency test signal is not available for use by a revenue-earning call, as the revenue-earning call would interfere with the test, and the test signal would be audible to the makers of the revenue-earning call.

It is known to test lines carrying live data (as distinct from speech), but this is a relatively simple problem because the information content of the signal consists of only a limited range of signals (e.g. DTMF tones, or binary digits), and it is relatively easy to identify elements of the signal which depart from this permitted set. In such arrangements, reliance is placed on the known forms of the permitted signals.

SUMMARY OF THE INVENTION

The present invention seeks to provide a method of testing a line whilst in use for carrying live speech. A testing system is known in which the signal-to-noise ratio, or other measurable characteristics, of the system are determined by classifying samples as speech or as noise and comparing the properties of each sample. This is disclosed in a paper by David B Ramsden in IEEE "Globecom 91" pages 1761 to 1764, and in European patent 0565424. However, this does not attempt to measure the properties of the speech content itself.

According to a first aspect of the invention, there is provided a method of analysis of characteristics of a telecommunications system by measuring properties of a speech signal carried by a line under test, the method comprising the steps of: identifying a characteristic of the speech content of the signal received at a testing point which is naturally substantially invariant between individual talkers, and detecting deviations from that characteristic in the signal, thereby identifying properties imposed by the system on the signal.

According to a second aspect of the invention, there is provided a method of analysis of characteristics of a telecommunications system by measuring properties of a speech signal carried by a line under test, the method comprising the steps of: identifying a part of the speech signal having a property which varies in a predetermined relationship to a property of the original speech signal, detecting variations from that relationship in the received signal, and estimating the properties of the original speech signal therefrom.

According to a third aspect of the invention, there is provided a method of analysis of characteristics of a telecommunications system by measuring properties of a call carried by a line under test, the method comprising the step of detecting deviations from a characteristic which is normally substantially invariant between individual calls.

According to a fourth aspect of- the invention, there is provided apparatus for analysis of characteristics of a telecommunications system by measuring properties of a speech signal carried by a line under test, comprising: means for identifying a characteristic of the speech content of the signal which is naturally substantially invariant between individual talkers, means for detecting deviations from that characteristic in the signal, and means for thereby identifying properties imposed by the system on the signal.

According to a fifth aspect of the invention, there is provided apparatus for analysis of characteristics of a telecommunications system by measuring properties of a speech signal carried by a line under test, comprising: means for identifying a part of the speech signal having a first property which varies naturally in relation to a second property of the original speech signal in a characteristic manner, means for detecting variations from that relationship in the receivedsignal, and means for estimating the properties of the original speech signal therefrom.

According to a sixth aspect, there is provided apparatus for analysis of characteristics of a telecommunications system by measuring properties of a call carried by a line under test, comprising means for detecting deviations from a characteristic which is normally substantially invariant between individual calls.

The invention also extends to a network management system and a telecommunications network comprising such apparatus.

The invention makes use of the fact that although the live speech signal generated at the signal source is not known at the test location, certain characteristics of the signal are known because they are constrained by the fact that the signal is speech and will therefore have certain characteristics peculiar to speech. The invention makes use of this fact by identifying the behaviour of the received signal in relation to these characteristics. Particular classes of properties which may be identified include:

1. Pseudo-Deterministic

Different talkers use different vowel sounds because of linguistic differences, but these all fall within a small, well-defined group because the human larynx and vocal tract are only capable of producing a limited range of vowel sounds, whose spectral structure is consistent across all talkers. Analysis of the actual spectral content of the vowels in a signal can identify distortions introduced by of the telecommunications system.

2. Consistently Varying Characteristics

Certain properties of speech vary in relation to certain other properties in a consistent way. If one of the properties is measurable at the test location, the value of the other property can be derived from it, even though it is not directly measurable. An example of such a relationship is the spectral variation of voiced fricatives according to the absolute loudness of the speaker's voice. The fricatives are those sounds created when the airstream is forced between two closely spaced articulators. They are represented in the International Phonetic Alphabet by the symbols shown in the table of FIG. 6. The spectral contents of the fricative sounds vary with the loudness (volume) with which the talker is speaking, and this variation is consistent across the population of talkers. This spectral content can, therefore, indicate the absolute level at which the talker is speaking. The absolute vocal level estimated in this way can be compared with the received signal strength to calculate losses in the telecommunications system. The vocal level of the speaker estimated in this way may also be a useful indicator of signal quality on the return path, as perceived by the speaker, as a person hearing a faint signal will tend to speak louder.

3. Gross Characteristics

A number of features of conversational speech can be used to identify difficulties the talkers may have in understanding each other. For example, if the talkers are not switching between each other smoothly, but are talking over each other, this can indicate difficulties in hearing each other or confusion over whose turn it is. If several calls on a given route are unusually short, this can also indicate a faulty line, as users are sticking to essential points of the call, or are giving up altogether and terminating the call, possibly to redial in the hope of getting a clearer line on the second attempt.

None of these classes of characteristics are completely invariant between talkers, but vary within known statistical distributions. More reliable measures of the properties of the network can be obtained by measuring a number of the characteristics referred to above, and/or a number of different talkers using the same line on different calls.

4. Known Non-Speech Signals

A line may also be monitored for certain types of signals having characteristic sounds, which should not be found accompanying a speech signal, e.g. feedback howl or data signals from a crossed line.

BRIEF DESCRIPTION OF THE DRAWINGS

The invention will now be described by way of example with reference to the drawings, in which.

DETAILED DESCRIPTION OF EXEMPLARY EMBODIMENTS

Figure 1:
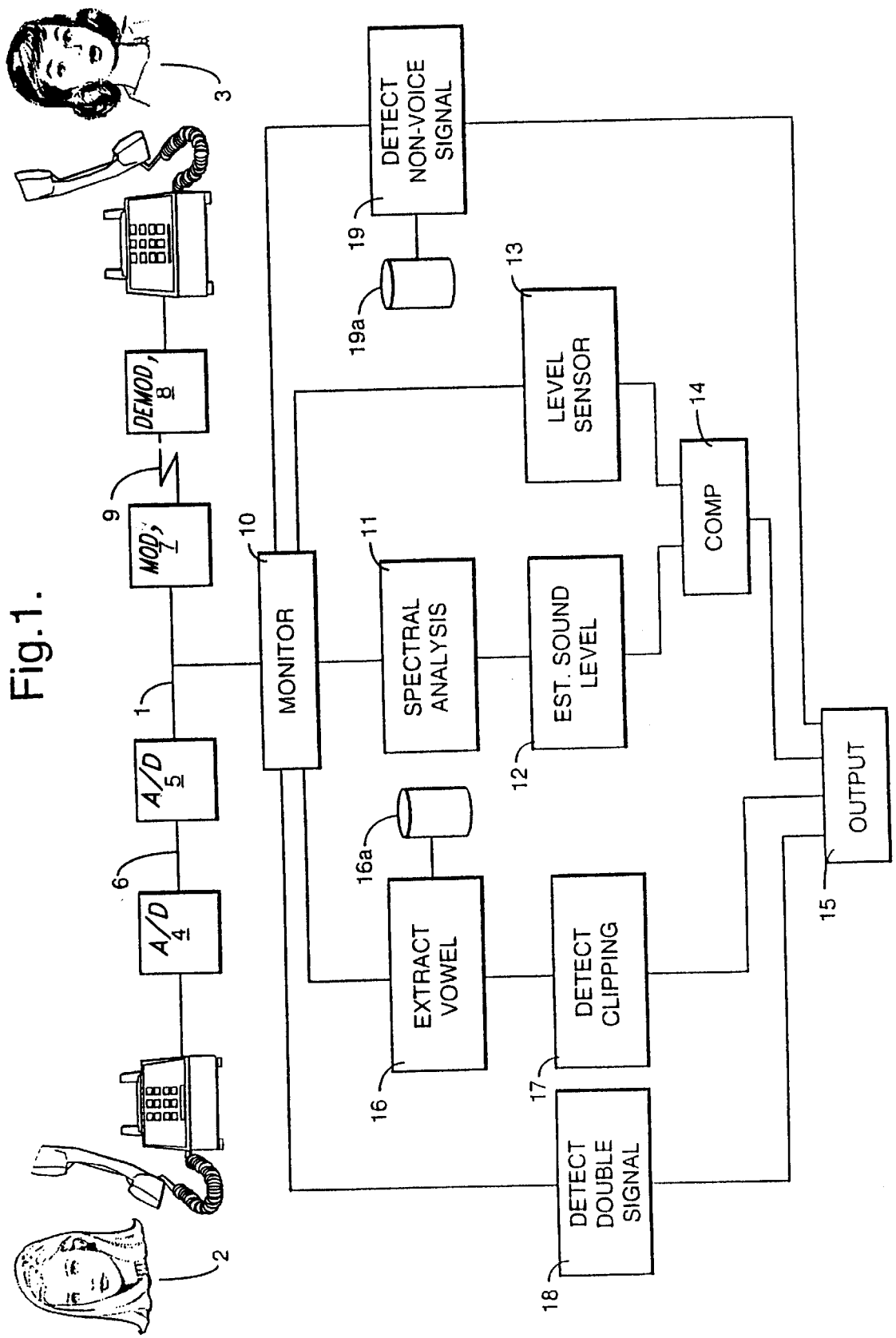
FIG. 1 shows apparatus suitable for operation according to the invention for monitoring a line carrying a telephone conversation.
Figure 8:
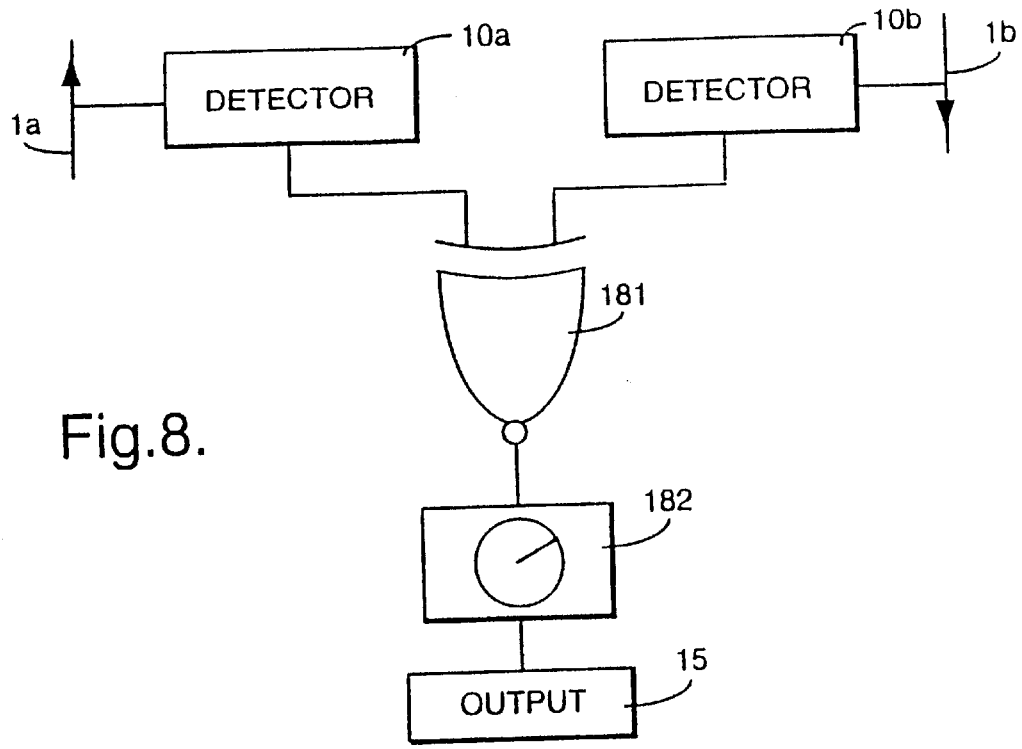
FIG. 8 shows part of the apparatus of FIG. 1 in more detail.

In FIG. 1 a telephone line 1 is carrying a conversation between talkers 2 and 3. As shown in FIG. 8 the telephone line comprises two channels 1a, 1b. The telephone system performs various operations on the signal, represented by network elements 4, 5, 7 and 8. For example elements 4 and 5 may be analogue-to-digital and digital-to-analogue convertors for a digital link 6, and elements 7 and 8 may be modulators/demodulators for a radio link 9.

The telephone line 1 is monitored by a monitoring device 10. Some measurements may require separate monitoring of the channels 1a, 1b, as shown by the monitors 10a, 10b in FIG. 8.

In the embodiment of FIG. 1, four signal properties are measured. Measurement path 11, 12, 13, 14 provides an estimate of attenuation between the speaker 2 and monitor 10. Measurement path 16, 16a, 17 identifies characteristic distortions. Measurement path 18, which comprises a combiner 181 and a timer 182, identifies double-talking. Measurement path 19, 19a identifies characteristic non-speech signals. All four measurement paths provide output to an output device 15 common to all the paths.

There are a number of properties which may be analysed in methods according to the invention, and representative examples corresponding to the four paths referred to above are described below.

It has been found that the high frequency spectral content of fricatives increases with the sound level of the talker, and this variation is consistent across a wide range of talkers. The spectral content of fricatives can thus be used as a measure of the sound level at which the talker is speaking. The first measurement path exploits this property. The signal is sampled by the monitor 10 and the samples are analysed by spectral analysis in an identifier 11 in order to identify the fricatives in the speech signal. An analyser 12 analyses in greater detail the spectral content of the fricatives identified in the identifier 11 and produces an output indicative of the estimated sound level of the talker. The identifier 11 uses high and low frequency filters to identify fricatives, as will be described in more detail below, and suitable fricatives are analysed by the analyser 12.

A sensor 13 detects the signal level in the monitored signal. This signal is compared in the comparator 14 with the output of the analyser 12. This value is passed to the output device 15.

Figure 2:
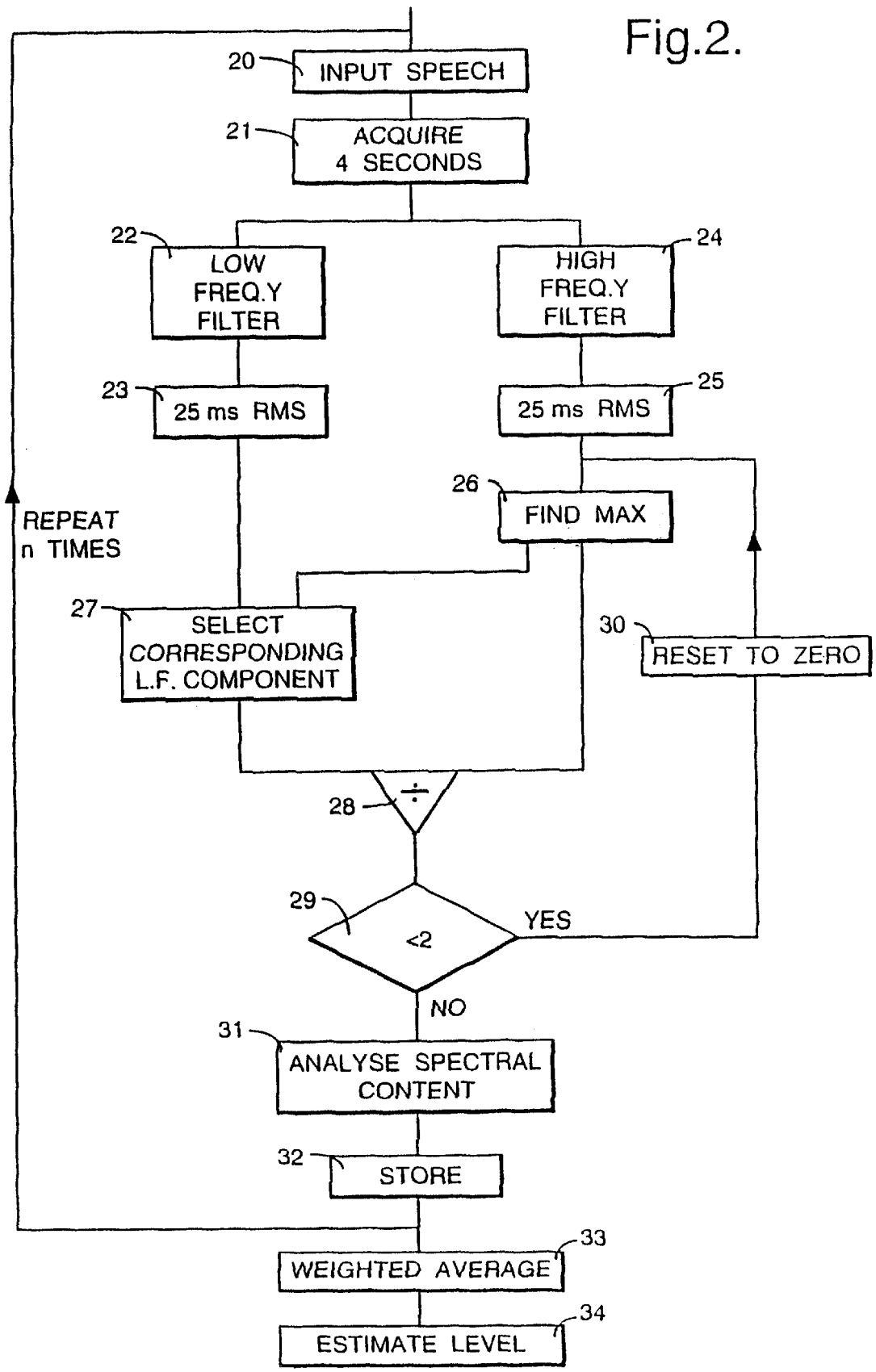
FIG. 2 shows a flow chart for a method according to the invention.

An example of this system in operation will now be described, with reference to FIGS. 2 to 6. FIG. 2 shows a flow chart for the operation of the system to measure vocal level. The process involves firstly identifying the unvoiced fricatives in the speech, and then analysing the spectral content of those fricatives. The process makes used of the identifier 11, and analyser 12, to provide an output to the comparator 14.

The phonemes known as "fricatives" (listed in FIG. 6) are grouped into two main classes. An unvoiced fricative, such as those used in the following example, has a large unvoiced (high frequency) component and a small voiced (low frequency) component. In contrast, a voiced fricative has large voiced and unvoiced components. The pitch of a given voiced component will vary from talker to talker. Affricates are a special class of fricatives which start with a closed vocal tract. Other voiced phonemes (e.g. vowels and nasals) lack a high frequency (unvoiced) component. Further details on phoneme classification can be found in standard works, such as "Mechanisms of Speech Recognition" by W A Ainsworth, Pergamon Press (1st Edition 1976), ISBN 0080203957.

In this exemplary arrangement, speech is input to the system (step 20, FIG. 2). A sample of the speech of 4 seconds duration is stored for analysis (step 21). A low frequency component is extracted (step 22), and the RMS level value of the component determined for each 25 millisecond period of the sample (step 23). Similarly a high-frequency component is extracted (step 24) and an RMS level value of this component determined for each 25 millisecond period of the sample (step 25). The period having the maximum RMS value for the high-frequency component is identified (26), and the address of this value is used to identify the corresponding RMS value for the low frequency component (27). The ratio of the two values is then calculated (step 28). If the high frequency component has an RMS value less than double that of the low frequency component, it is rejected as not being an unvoiced fricative (step 29). This region of the sample is then zeroed (step 30), and a new maximum is identified (step 26).

When the characteristic signature of an unvoiced fricative (a high frequency component having an RMS value more than double the low frequency component) is identified in step 29, the relevant 25 millisecond period is analysed for spectral content (step 31). This result is stored (step 32) and the process is repeated for a number of samples in order to build up a number of individual spectral content measurements. A weighted average of all the selected samples is then determined (step 33) from which the talker's actual vocal level can be estimated (step 34), using the known relationships between the fricatives' spectral content and talker's vocal level.

Figure 3A:
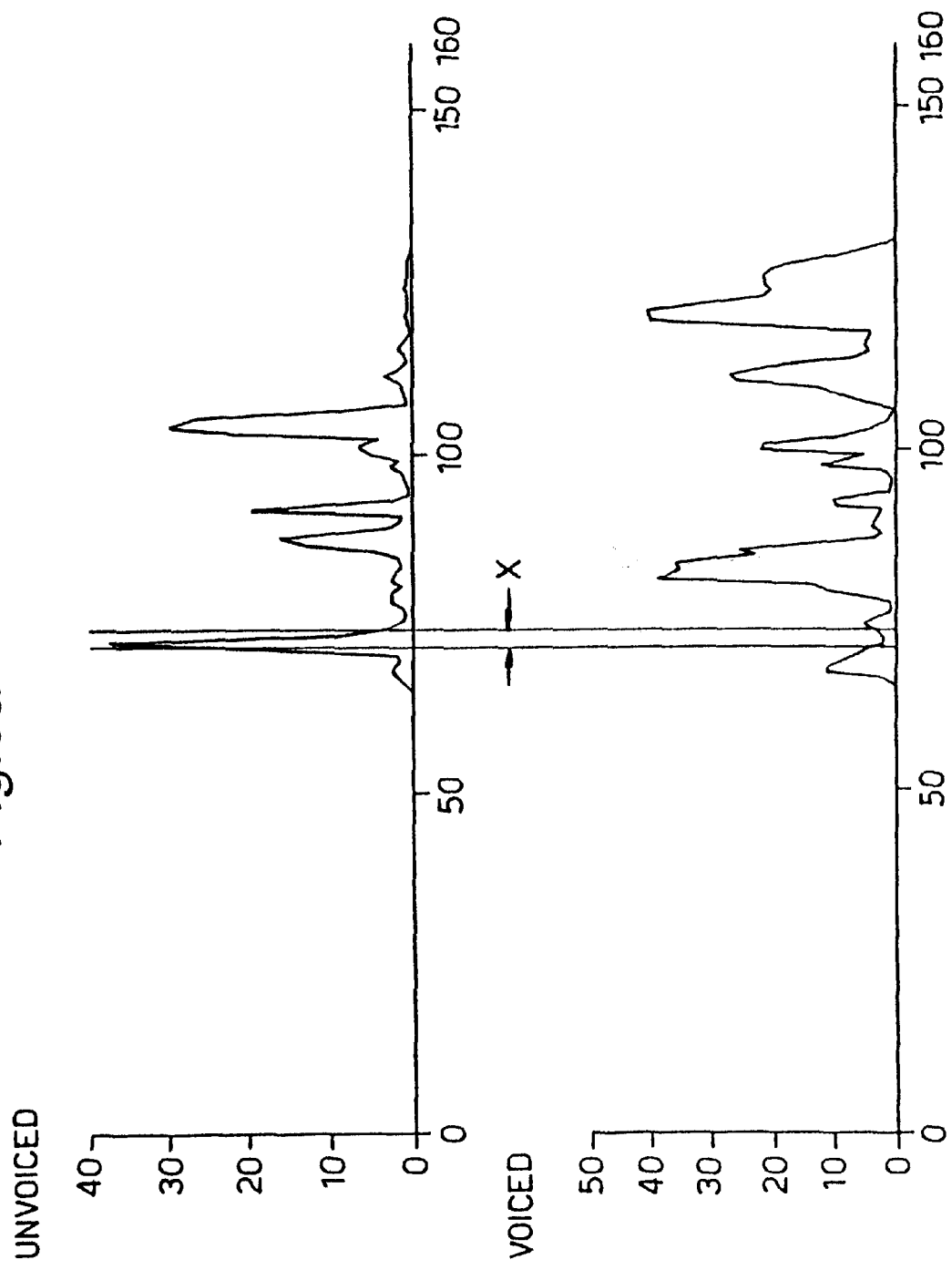
FIGS. 3a to 5b show various signal measurements made in performing the invention.

FIGS. 3a to 5b illustrate how a property of speech, and in particular the spectral content of an unvoiced fricative (or, as in this example, the unvoiced part of a voiced fricative) can vary with vocal level. It will be apparent to the person skilled in this field that voiced fricatives could also be used to identify the vocal level, because the unvoiced part of the fricative behaves in the same manner. A voiced fricative can be identified by a large RMS value in both voiced and unvoiced spectral ranges. In FIGS. 3a and 3b the horizontal axis represents time (in 25 millisecond units) and the vertical axis represents RMS amplitude (averaged over 25 milliseconds). FIG. 3a shows the unvoiced (high frequency) component of a speech sample (upper plot) and the voiced (low frequency) component of the same sample (lower plot) of a talker reciting the passage "He was reported to be a prisoner of war". The segment marked 'X', corresponding to the 's' of "was", has a very high RMS level for the unvoiced component and a very low RMS level for the voiced component. The waveform for this segment when expanded, is as shown in FIG. 4a and the power spectrum is shown in FIG. 5a.

Figure 3B:
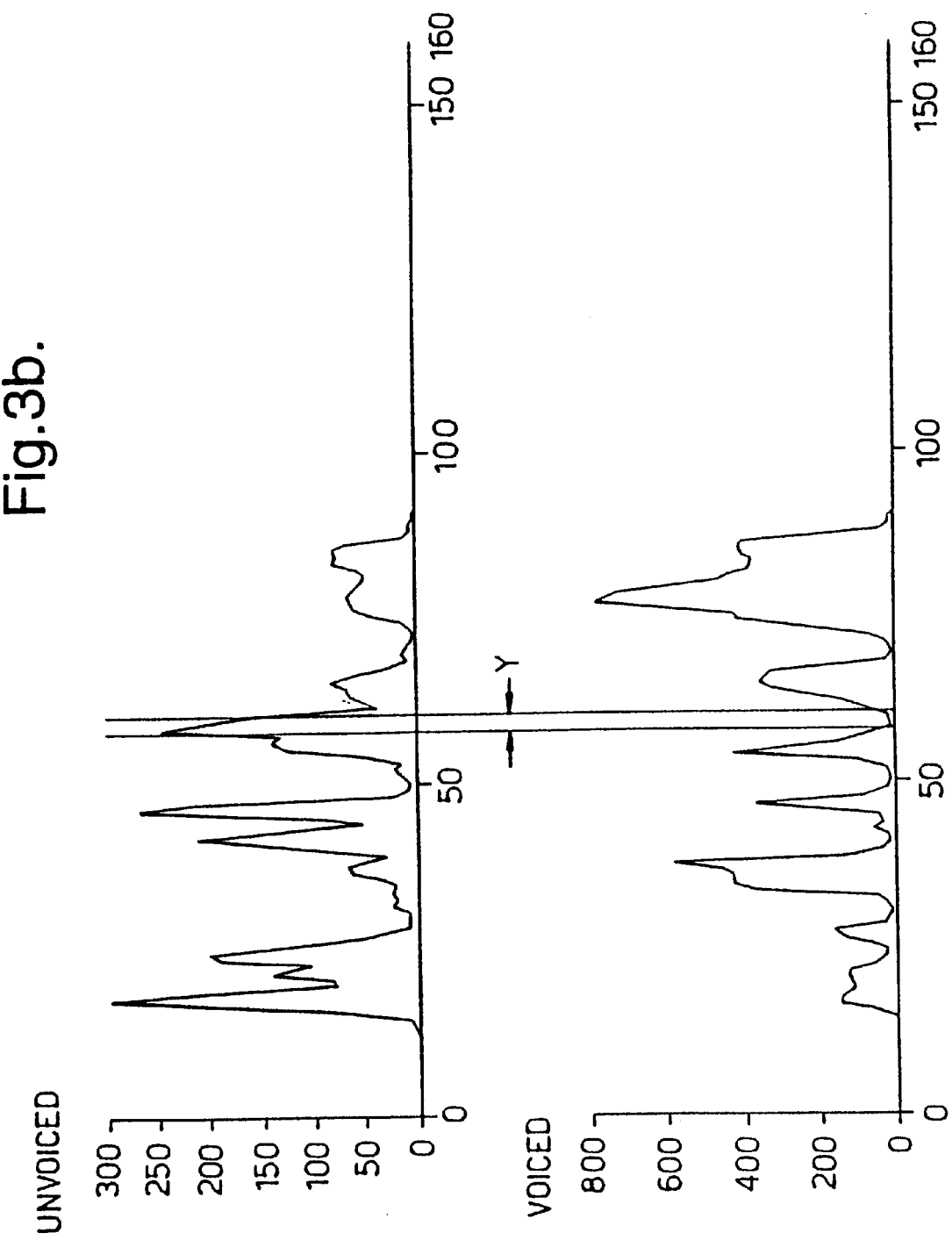
Figure 4A:
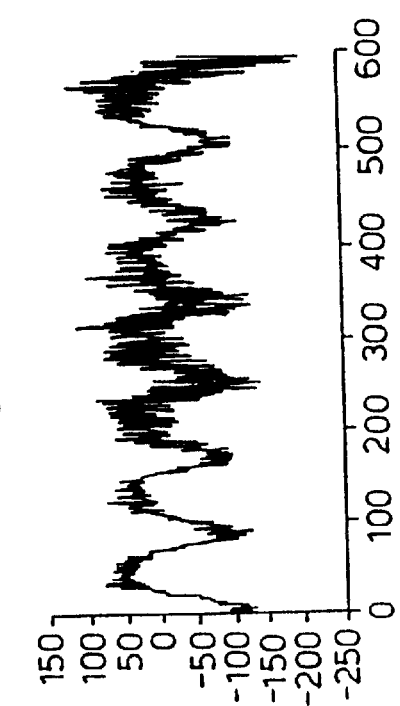

In FIG. 4a (and FIG. 4b below) the horizontal axis again represents time, in units of 1/400 of the units in FIGS. 3a and 3b (i.e. 0.0625 millisecond/division). The vertical axis represents amplitude in units of 0.1 mV.

Figure 5A:
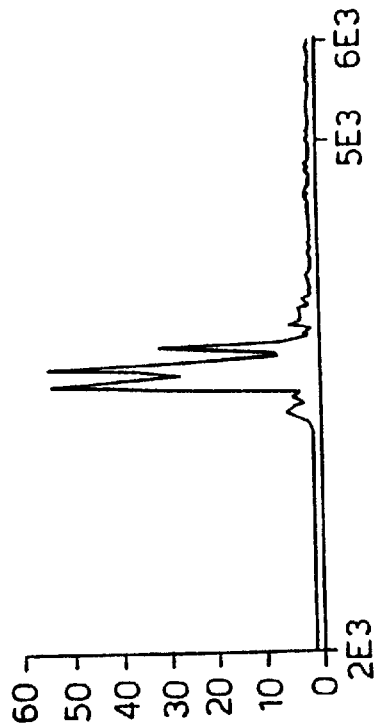

In FIG. 5a (and FIG. 5b below) the horizontal axis represents frequency on a logarithmic scale from 2 KHz to 6 KHz. The vertical axis represents power on an exponential (antilog) scale, the units being the antilogarithm of the signal strength (in dB/20).

Figure 5B:
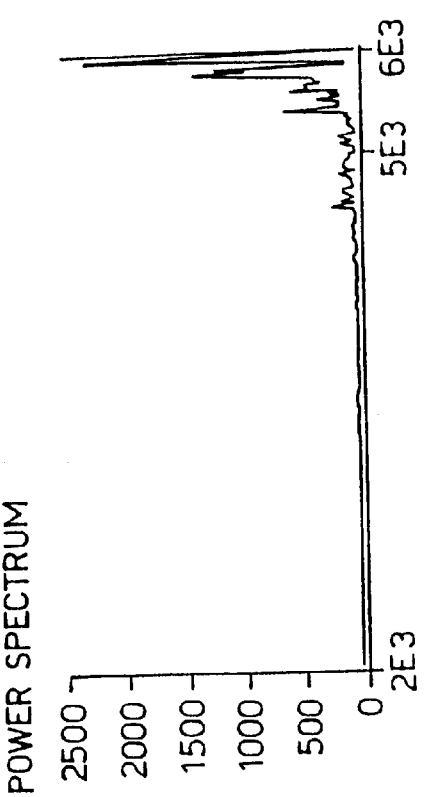
Figure 4B:
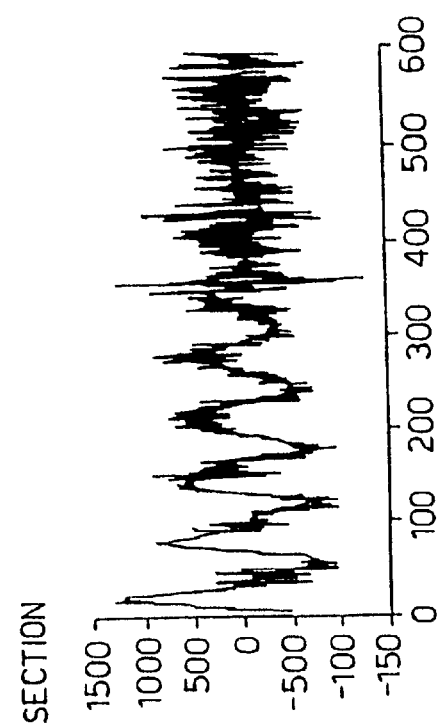

Corresponding plots to those in FIGS. 3a, 4a and 5a are shown in FIGS. 3b, 4b and 5b, for a sample of the same talker reciting the same passage more loudly. It will be seen that the power spectrum (FIG. 5b) has more high-frequency components.

In this sample a different fricative event (the 's' of 'prisoner', identified as the segment 'y' in FIG. 3b) was identified as the maximum value of the unvoiced component.

It has been found that the inter-relationship between fricative spectral content and the talker's vocal level is sufficiently independent both of the individual talker, and of the fricative spoken. Once the fricatives have been identified, their spectral content can therefore be used as an indication of vocal level without any prior knowledge of the talker or the content of the speech.

Figures 6, 7:
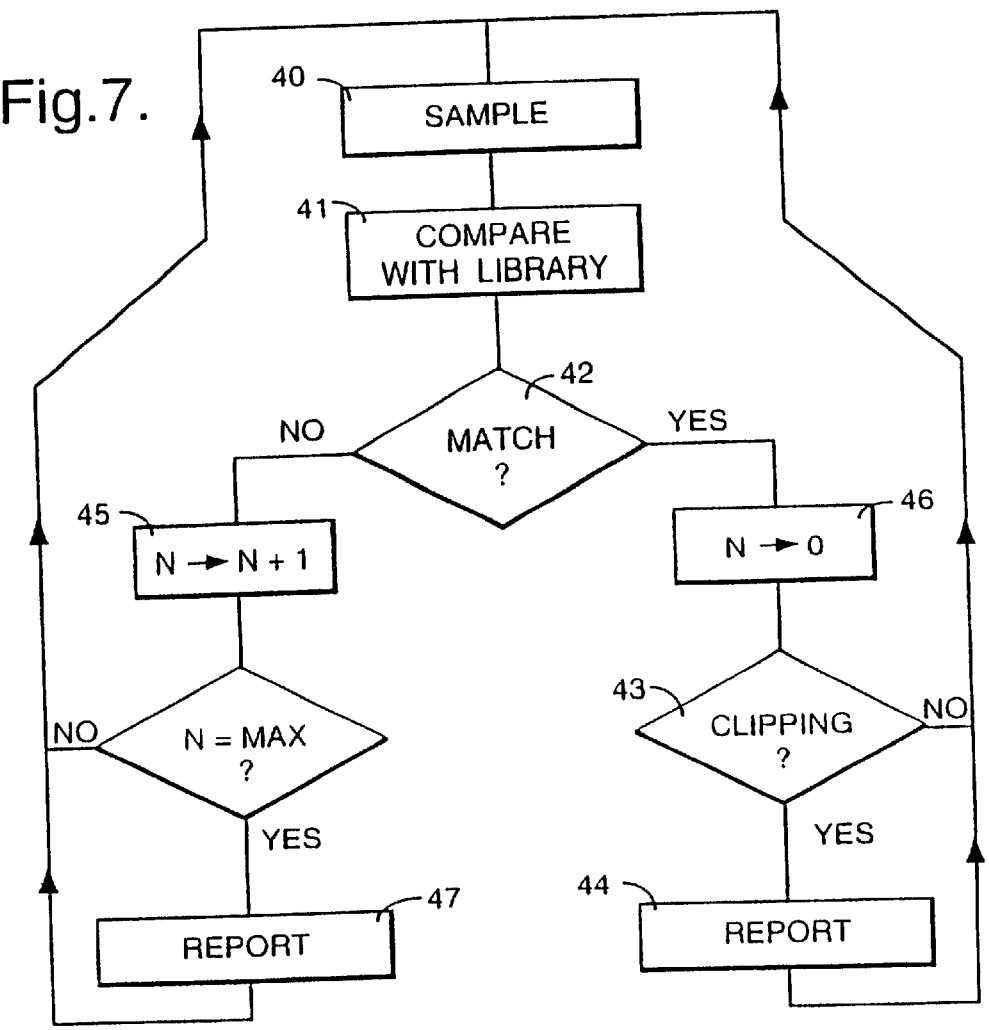
FIG. 6 is a table showing the standard International Phonetic Alphabet symbols for the fricatives.
FIG. 7 shows a flow chart for another method according to the invention.

Referring now to FIGS. 1 and 7, in the second path, the signal is periodically monitored by the monitor 10 as before (step 40). A spectral identifier 16 is arranged to identify and extract from the monitor 10 waveforms having the characteristics of given vowel sounds identified by comparison with a library of such waveforms 16a (step 41). The shape of the waveform, and thus the general spectral shape, of a given vowel sound is consistent across a wide range of talkers, although different talkers use different centre frequencies.

In practice waveforms may be recognised by analysis of the spectrum produced. The waveform and the frequency spectrum are related by the Fourier Transform method, as is well known.

When the identifier 16 identifies a waveform characteristic of one of the vowel sounds that it is arranged to identify (step 42), an analyser 17 then analyses the waveform in greater detail. For example, it will look for a large high frequency component, which is indicative of peak clipping (step 43). These characteristic distortions are identified to output 15 (step 44). The analyser 17 analyses the waveforms detected by the monitor 10 to determine the value of a property of the signal which is consistent over all talkers, and therefore to measure the change in that property imposed by the elements 4, 5, 6 or 7, 8, 9.

The resolution of the identifier 16 must be sufficiently coarse, not only to cope with the natural variations between different talkers, but also to identify the required vowel sound even though it has been distorted. Of course, in extreme cases, the distortion may be too great for the signal to be recognised as speech. If a prescribed duration of signal yields no speech-like segments, or less than a predetermined minimum number of them, the presence of a very high level of distortion can be deduced. In order to detect this situation a counter N is incremented by 1 every time the matching process 42 fails to identify one of the vowel sounds (step 45) and is reset to zero every time a match is identified (step 46). If the value of N attains a predetermined value (MAX) this is reported to the output 15 as being indicative of very bad distortion (step 47)

Referring now to FIG. 8, the monitor 10 and detector 18 are shown in more detail. The monitor 10 comprises two detectors 10a, 10b, each sampling traffic on one of the two channels (1a and 1b) which make up the two way link 1. The samples from the two detectors 10a, 10b are fed through a combiner (coincidence gate 181, effectively an exclusive OR gate and an inverter) which produces an output only when both detectors 1a, 1b produce the same output. The output of the combiner 181 controls a timer 182. If the timer 182 receives an input from the combiner 181 for longer than a predetermined period, this causes an alert to be transmitted to the output device 15. This system identifies when two speech signals are being carried on the same line by detecting the presence of simultaneous speech on both the outward and return traffic channels. This situation does not occur in normal conversation for extended periods, and its occurrence for more than a short time is indicative that at least one of the talkers cannot hear the other, even though both may be clear at the measurement point. This obviously suggests that there is a line fault. Similarly, simultaneous silence from both parties may also indicate the same problem, as one party waits in vain for the other to speak. The detector 18 monitors this situation, and should it persist for the predetermined period established by the timer 182 sends an alert to the output 15.

The coincidence gate 181 illustrated may be replaced with an AND gate if it is not required to detect simultaneous silence from both parties.

Figure 9:
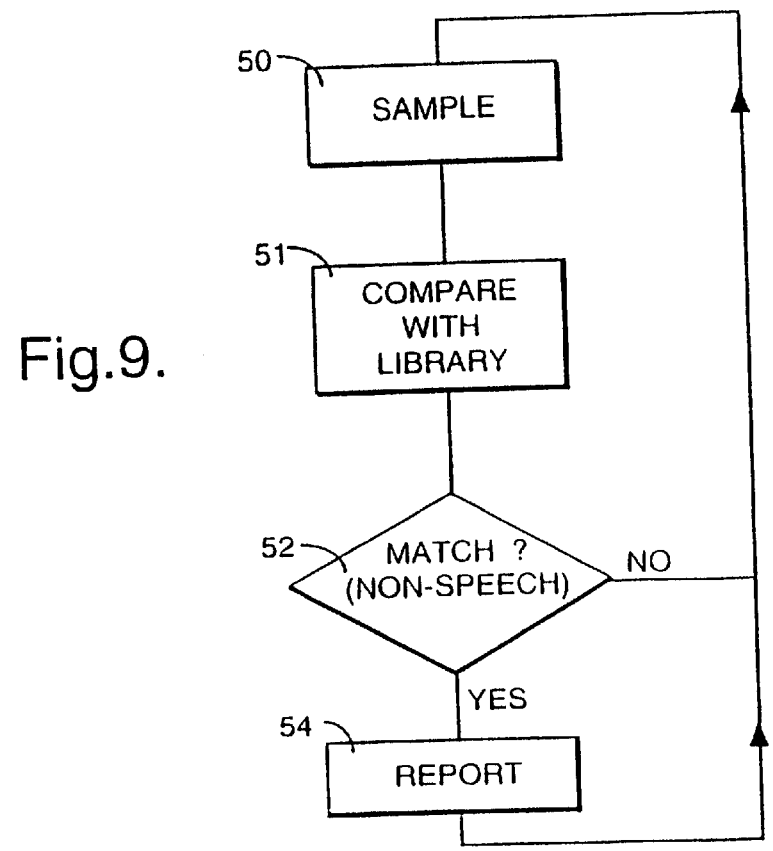
FIG. 9 shows a flow chart for another method according to the invention.

Referring now to FIGS. 1 and 9, a fourth path, again using the signal from the monitor 10, may be arranged to use another spectral identifier 19 to identify characteristic non-voice signals which should not appear on a line currently carrying speech. The signal is periodically sampled by the monitor 10 as before (step 50). The spectral identifier 19 is arranged to identify and extract from the monitor 10 waveforms having the characteristics of given non-voice sounds identified by comparison with a library 19a of such waveforms (step 51). When the identifier 19 identifies a waveform characteristic of one of the vowel sounds that it is arranged to identify (step 52), this is reported to the output 15 (step 54). The identifier 19 may, for example, be set up to pick out the spectral signatures of facsimile transmissions, or that of acoustic feedback howl. The presence of such signatures is reported to the output device 15. This report may include a measure of the strength of this interference.

Facsimile transmissions may intentionally occur on a line that normally carries speech, although they should not occur on the same line simultaneously. It is therefore appropriate to perform an additional test to check whether speech is also present.

The strength of signal produced by a talker, as measured by the analyser 12 in the first path, may be used as an indication of the signal strength on the return traffic channel, perceived by the talker, but other factors such as ambient noise or interference on the line may also cause the talker to speak louder. These other sounds may be identifiable using the detector 19.

The monitor 10 does not remove the signal, nor does it impose any signal on the line. Therefore, the line can be used to carry a live conversation whilst it is being tested. No information about the input signal is required, although if the line can be used for non-speech transmissions (e.g. facsimile) the monitor 10 should perform a preliminary step of checking whether the transmission is speech or not.

The system may form part of a line-testing system, in which the individual lines are scanned (by means not shown) to find those carrying speech, as distinct from those carrying data, or lines currently not in use, and the monitor 10 is then connected into the speech carrying lines sequentially in order to monitor the quality of all such lines.

The output device 15 may be used in a number of ways. For example, it may be used to control the telecommunications system to bring the level to within acceptable limits. The output device 15 may provide a signal to a network controller to alert him or her to a line which is performing outside specified limits. Alternatively, the output device 15 may control switching in the network to transfer the call between the talkers 2, 3 to another route on which line quality may be better.

Other properties than those described in detail above may be monitored. For example the duration of calls using a particular channel may be monitored. Should a large number of very short calls be recorded this can be used to trigger an alert to the output 15, as it is likely that such calls have been abandoned by the users because of some difficulty the users are experiencing. A succession of such abandonments by different callers using the same channel is indicative that the problem is with the channel itself.

What is claimed is:

1. A method of analysis of characteristics of a telecommunications system by measuring properties of a speech signal carried by a line under test, the method comprising the steps of:

identifying a characteristic of the speech content of the signal received at a testing point which is naturally substantially invariant between individual talkers, and detecting deviations from that characteristic in the signal thereby identifying properties imposed by the system on the signal whereby the characteristics of the telecommunications system are identified.

2. A method according to claim 1, in which the speech signal is monitored for waveforms having approximations to a predetermined spectral signature, and deviations from the spectral signature are identified.

3. A method according to claim 2, wherein the spectral signature is that of a vowel sound.

4. A method according to claim 2, wherein the deviations are large spectral components at the high and/or low frequency extremes of the spectral signature.

5. A method according to claim 1 wherein the naturally substantially invariant characteristic is the manner in which a measured property varies in relation to a property of the original speech signal, the method comprising the steps of:

identifying a part of the speech signal having a property which varies in a predetermined relationship to a property of the original speech signal, detecting variations from that relationship in the received signal, and estimating the properties the original speech signal therefrom.

6. A method of analysis of characteristics of a telecommunications system by measuring properties of a call carried by a line under test, the method comprising the step of detecting deviations from a characteristic which is normally substantially invariant between individual calls wherein the normally substantially invariant characteristics include one or both of:

(a) the proportion of time that more than one party to the call is speaking at once; and (b) the call duration exceeding a predetermined minimum.

7. A method of analysis of characteristics of a telecommunications system by measuring properties of a speech signal carried by a line under test, the method comprising the steps of:

identifying a part of the speech signal having a property which varies in a predetermined relationship to a property of the original speech signal, detecting variations from that relationship in the received signal, and estimating the properties of the original speech signal therefrom whereby the characteristics of the telecommunication system are identified.

8. A method according to claim 7, wherein the property of the original speech signal is the absolute level of the voice, and the measured property is a talker-independent function of the absolute level.

9. A method according to claim 8, in which as an initial step the traffic carried by a plurality of lines is monitored for each line sequentially to identify whether speech is being carried, the subsequent steps being carried out on a line on which speech is identified.

10. A method of analysis of characteristics of a telecommunications system by measuring properties of a speech signal carried by a line under test, the method comprising the steps of:

9 identifying a part of the speech signal having a property which varies in a predetermined relationship to a property of the original speech signal, detecting variations from that relationship in the received signal, and estimating the properties of the original speech signal therefrom;

the property of the original speech signal being the absolute level of the voice, the measured property being a talker-independent function of the absolute level; and the talker-independent function being the relationship between the spectral content of the unvoiced fricatives in the speech, and the absolute level.

11. A method of analysis of characteristics of a telecommunications system by measuring properties of a speech signal carried by a line under test, the method comprising the steps of:

identifying a part of the speech signal having a property which varies in a predetermined relationship to a property of the original speech signal, detecting variations from that relationship in the received signal, and estimating the properties of the original speech signal therefrom;

the property of the original speech signal being the absolute level of the voice, the measured property being a talker-independent function of the absolute level; and the measured absolute sound level so determined being compared with the signal strength at the test location.

12. Apparatus for analysis of characteristics of a telecommunications system by measuring properties of a speech signal carried by a line under test, said apparatus comprising:

means for identifying a characteristic of the speech content of the signal which is naturally substantially invariant between individual talkers, means for detecting deviations from that characteristic in the signal, and means for thereby identifying properties imposed by the system on the signal whereby the characteristics of the telecommunication system are identified.

13. Apparatus according to claim 12, comprising means for monitoring for waveforms having approximations to a predetermined spectral signature, and means for identifying deviations from the spectral signature.

14. Apparatus according to claim 13, wherein the spectral signature is that of a vowel sound.

15. Apparatus according to claim 13, wherein the identifying means includes means for identifying large spectral components at the high and/or low frequency extremes of the spectral signature.

16. Apparatus according to claim 12 comprising means for identifying a part of the speech signal having a first property which varies naturally in relation to a second property of the original speech signal in a characteristic manner, means for detecting variations from that relationship in the received signal, and means for estimating the properties of the original speech signal therefrom.

17. Apparatus according to claim 12, further comprising means for monitoring the traffic carried by a plurality of lines for each line sequentially to identify whether speech is being carried, and means for controlling the apparatus to measure the properties on a line on which speech is identified.

10

18. A network management system comprising apparatus according to claim 12, means for deriving therefrom an output indicative of the signal quality resulting from use of individual elements of the system, and means for controlling the network in response to the derived signal quality to minimise the use of elements associated with poor signal quality.

19. A telecommunications system including apparatus according to claim 12.

20. Apparatus for analysis of characteristics of a telecommunications system by measuring properties of a call carried by a line under test, comprising:

means for detecting deviations from a characteristic which is normally substantially invariant between individual calls; and means for monitoring one of or both of:
the proportion of time that more than one party to the call is speaking at once; and
the duration of the call.

21. Apparatus for analysis of characteristics of a telecommunications system by measuring properties of a speech signal carried by a line under test, said apparatus comprising:

means for identifying a part of the speech signal having a first property which varies naturally in relation to a second property of the original speech signal in a characteristic manner, means for detecting variations from that relationship in the received signal, and means for estimating the properties of the original speech signal therefrom whereby the characteristics of the telecommunications system are identified.

22. Apparatus according to claim 21 comprising means for measuring a talker-independent function of the absolute voice amplitude, and means for determining therefrom the absolute loudness of the voice.

23. Apparatus for analysis of characteristics of a telecommunications system by measuring properties of a speech signal carried by a line under test, comprising:

means for identifying a part of the speech signal having a first property which varies naturally in relation to a second property of the original speech signal in a characteristic manner, means for detecting variations from that relationship in the received signal, means for estimating the properties of the original speech signal therefrom;

means for measuring a talker-independent function of the absolute voice amplitude, and means for determining therefrom the absolute loudness of the voice;

the talker-independent function being the relationship between the spectral content of the unvoiced fricatives in the speech and the absolute level.

24. Apparatus for analysis of characteristics of a telecommunications system by measuring properties of a speech signal carried by a line under test, comprising:

means for identifying a part of the speech signal having a first property which varies naturally in relation to a second property of the original speech signal in a characteristic manner, means for detecting variations from that relationship in the received signal, means for estimating the properties of the original speech signal therefrom;

means for measuring a talker-independent function of the absolute voice amplitude, and means for determining therefrom the absolute loudness of the voice; and means for comparing the absolute sound level so determined with the signal strength at the test location.

* * * * *